US012811858B2

(12) United States Patent
Spratt et al.

(10) Patent No.: US 12,811,858 B2
(45) Date of Patent: Nov. 24, 2026

(54) FAST AND EFFICIENT CLASSIFICATION SYSTEM

(71) Applicant: PERMUTIVE LIMITED, London (GB)

(72) Inventors: Tim Spratt, London (GB); Josh Forman-Gornall, London (GB)

(73) Assignee: PERMUTIVE LIMITED, London (GB)

( * ) Notice: Subject to any disclaimer, the term of this patent is extended or adjusted under 35 U.S.C. 154(b) by 1441 days.

(21) Appl. No.: 17/280,709

(22) PCT Filed: Sep. 27, 2019

(86) PCT No.: PCT/EP2019/076314
§ 371 (c)(1),
(2) Date: Mar. 26, 2021

(87) PCT Pub. No.: WO2020/065069
PCT Pub. Date: Apr. 2, 2020

(65) Prior Publication Data

US 2022/0004887 A1 Jan. 6, 2022

(30) Foreign Application Priority Data

Sep. 28, 2018 (EP) .................................... 18197508

(51) Int. Cl.
*H04L 41/16* (2022.01)
*G06N 5/022* (2023.01)
(Continued)

(52) U.S. Cl.
CPC ............ *H04L 41/16* (2013.01); *G06N 5/022* (2013.01); *H04B 1/02* (2013.01); *H04B 1/06* (2013.01)

(58) Field of Classification Search
CPC ..................................................... G06N 5/022
See application file for complete search history.

(56) References Cited

U.S. PATENT DOCUMENTS 7,577,709 B1 8/2009 Kolcz
9,292,793 B1 * 3/2016 Lin ......................... G06F 21/44
(Continued)

FOREIGN PATENT DOCUMENTS

KR 1020170123672 A 11/2017
KR 1020180070683 A 6/2018
(Continued)

OTHER PUBLICATIONS

Bartoldson, Brian, Adrian Barbu, and Gordon Erlebacher. "Enhancing the regularization effect of weight pruning in artificial neural networks." arXiv preprint arXiv:1805.01930 (2018). https://arxiv.org/pdf/1805.01930 (Year: 2018).*

(Continued)

*Primary Examiner* — Michael H Hoang
(74) *Attorney, Agent, or Firm* — Haynes and Boone, LLP

(57) ABSTRACT

A server for generating trained classification model for classifying an entity or classifying the similarity of the entity to other entities. The server comprises storage means arranged to store characteristics of a first plurality of entities, wherein each one of the first plurality of entities is classified with a first classification. The server comprises a training module arranged to train a classification model to classify an input entity with the first classification, or to classify the similarity of the input entity to the first plurality of entities, based on characteristics of the input entity. The classification model is trained using characteristics of the first plurality of entities as training data. The server further comprises a transmitter arranged to transmit the trained classification model to a client device for use at the client device.

20 Claims, 6 Drawing Sheets

(51) Int. Cl.

| | |
|---|---|
| ***H04B 1/02*** | (2006.01) |
| ***H04B 1/06*** | (2006.01) |

(56) References Cited

U.S. PATENT DOCUMENTS

| | | | | |
|---|---|---|---|---|
| 10,242,232 | B1 * | 3/2019 | Hurry | H04L 63/107 |
| 11,423,259 | B1 * | 8/2022 | Pratusevich | G06N 20/00 |
| 2012/0101968 | A1 | 4/2012 | Banerjee et al. | |
| 2014/0370485 | A1 * | 12/2014 | Deane | G09B 7/02<br>434/353 |
| 2017/0102978 | A1 * | 4/2017 | Pallath | G06F 11/0751 |
| 2018/0197087 | A1 | 7/2018 | Luo et al. | |
| 2018/0225372 | A1 * | 8/2018 | Lecue | G06F 16/36 |
| 2020/0311616 | A1 * | 10/2020 | Rajkumar | G06N 3/008 |

FOREIGN PATENT DOCUMENTS

| | | | |
|---|---|---|---|
| WO | 2018048934 | A1 | 3/2018 |
| WO | 2018048945 | A1 | 3/2018 |
| WO | 2018083532 | A1 | 5/2018 |
| WO | 2018083672 | A1 | 5/2018 |

OTHER PUBLICATIONS

Wang, et al., When Edge Meets Learning: Adaptive Control for Resource-Constrained Distributed Machine Learning, IEEE Infocom 2018—IEEE Conference on Computer Communications, Apr. 2018, Honolulu, HI, USA.

Dhoedt, et al., Machine Learning at the Edge, IEEE International Joint Conference on Neural Networks, Jul. 2015.

Ma, Qiang, et al., A Sub-Linear Massive-Scale Look-alike Audience Extension System. IEEE 16th International Conference on Data Mining Workshops, Dec. 2016.

Givens, What's the Deal with Lookalike and Similar Audiences. Retrieved from Internet, Web/20180201165409/https://www.salesforce.com /Blog/Authors/ Hilary-Givens.html, Jan. 2017.

Hardy, Distributed deep learning on edge-Devices: feasibility via adaptive compression, Nov. 2017, vol. 1, pp. 1-8.

European Patent Office, PCT International Search Report and Written Opinion of the International Searching Authority for International Application No. PCT/EP2019/076314; 10 pages; Officer Von Der Straten, G., NL-2280 HV Rijswijk.

* cited by examiner

FAST AND EFFICIENT CLASSIFICATION SYSTEM

CROSS REFERENCE TO RELATED APPLICATIONS

This application is a 371 United States national phase application of co-pending international patent application No. PCT/EP2019/076314, filed Sep. 27, 2019 which claims priority to EP Patent Application No. 18197508.7 filed Sep. 28, 2018, the disclosures of which are incorporated herein by reference.

TECHNICAL FIELD

This disclosure relates to a system, a computer-implemented method and a computer program for classifying an entity, or classifying the similarity of the entity to other entities.

BACKGROUND

In the coming years it is anticipated that the number of internet connected devices, as part of the internet of things (IoT), will increase exponentially. These devices are intended to collect data and transmit that data to the 'cloud'. As the number of devices and the amount of data they collect increases substantially, the computational and storage demand on the cloud servers becomes problematic. In addition, there is the issue of finite bandwidth meaning the transmission of data to the cloud may also become troublesome.

The number of applications of machine learning is also rapidly growing. It is becoming a common feature of many platforms and solutions and is useful when processing large amounts of data, particularly for pattern recognition, anomaly detection and forming data associations.

Electronic devices, particularly those connected wirelessly to the internet, including mobile phones, expend a significant portion of their energy usage on connecting and transferring data to and from the internet via Wi-Fi, a telecoms data network or other means. In devices such as mobile phones, the energy stored in the battery represents a constraint on the usage-time of the device when it is necessary to send and receive data frequently and for a prolonged period of time to/from the internet. For cloud processing and analytics platforms in general, including those with machine learning features, it is commonly the case that the device is required to stay in regular communication with the cloud, such that the data stored in the cloud is kept up-to-date with data collected on the device. In terms of usage, it is therefore undesirable that a cloud-based, machine learning system often requires a high volume of frequent data transmissions.

Classifying, or 'segmenting', entities (such as a devices or users) based on the data associated with these entities (such as their characteristics) is a powerful means of identifying specific entities that are of interest for a particular reason. For instance, it is desirable to be able to classify a specific device in a system as malfunctioning so that the necessary action can be taken in order to bring the system back into full working order. In another example, it is desirable to be able to classify a device, or a user, as representing a security threat so that appropriate precautions can be made to neutralise the threat.

Classifying entities using set criteria can be restrictive and can potentially result in missing entities from a particular classification. For instance, it might be the case that some entities that do not meet the full criteria still have sufficient relevancy that they should also be included in a classification group, or segment.

Automating the decision as to which entities should be given a particular classification is useful, particularly for a system that needs to classify entities in near real-time. In addition, it would take a prohibitively long time to manually classify entities and for such a system to remain scalable for large datasets. For a relevant set of entities with a particular classification, the decision as whether to include a user or device in the class should be based on its relevance, or its similarity to the entities that satisfy the classification criteria. For instance, it may be the case that there are unknown correlations between the characteristics of the entities, which may result in missing entities from a particular classification.

Machine learning algorithms can be trained with data sets that are continuously changing, as more data is uploaded and received. Retraining involves learning new parameters for the model, and these new model parameters can render the classifications assigned previously to entities obsolete. However, it may be computationally expensive and time sensitive to re-classify all entities that were previously classified. For instance, in a typical cloud environment, a system with 100 million classified entities will reclassify all 100 million entities for a given classification that has new model parameters.

In light of the above, there is a need for a system that can quickly and accurately classify entities and identify entities that are similar to entities of a particular classification. It is desirable for this to be achieved in a manner that makes efficient use of processing resources and bandwidth. In addition, there is a need for reclassifying previously classified entities in a computationally efficient manner.

SUMMARY

In one aspect of the invention, there is provided a system for classifying an entity or classifying the similarity of the entity to other entities, the system comprising;

- a server comprising:
  - storage means arranged to store characteristics of a first plurality of entities, wherein each one of the first plurality of entities is classified with a first classification;
  - a training module arranged to train a classification model to classify an input entity with the first classification, or to classify the similarity of the input entity to the first plurality of entities, based on characteristics of the input entity, wherein the classification model is trained using characteristics of the first plurality of entities as training data; and
  - a transmitter arranged to transmit the trained classification model to a client device; and wherein the system further comprises a client device comprising:

- a receiver arranged to receive the trained classification model; and
- memory arranged to store the trained classification model; and
- a processor arranged to process data comprising characteristics of at least one input entity using the trained classification model stored at the client device thus causing the trained classification model to output a signal that:

classifies the at least one input entity with the first classification; or classifies the similarity of the at least one input entity to the first plurality of entities.

In the invention a machine learning (ML) model (i.e. the classification model) is trained using characteristics of entities with the first classification in order to classify another entity with the same classification. In this way, unclassified entities can be classified more accurately than using a restrictive set of pre-determined criteria. In addition, the ML model is trained to classify the similarity of the entity to the entities with the first classification. This allows entities that are similar to other classified entities to be identified.

In the invention, the ML model is trained at a server in the cloud. The ML model is then distributed to a client device, and the ML model is executed at the client device in order to output the classification. This eases the burden on cloud servers and the transmission network. This also reduces the power consumption of the client device, since the client device is not required to train the ML model. In addition, once the model parameters have been received at the client device on the edge, the client device can continue to classify and react to data being generated on the device without requiring a connection to the internet. This is valuable in cases where connectivity is variable or unstable and in the face of central server failure, since it makes classification for the device autonomous and robust.

Processing of the data relating to the input entity is done on the processor of the client device, without the need to send this data to the cloud. This negates the need for constant, frequent communication between cloud servers and client device. Therefore, this solution is less energy intensive, which is particularly useful for battery-operated devices. This also assists in preventing sensitive data from being sent to malicious entities which improves security and data privacy.

A further advantage of the invention is that the number of processors, and therefore the processing capacity of the system, is proportional to the number of devices involved. Also, since the amount of data being transmitted is reduced, bandwidth constraints become less problematic. Thus, the system is inherently scalable.

Moreover, the time taken to process the devices' data remains constant, regardless of the size of the system. From the perspective of the client device or user, the processing can be carried out in near real-time regardless of the size of the network. In the context of a data management system, having negligible latency between data collection and processed output is highly advantageous as it enables live interaction with, or reaction to, devices or users.

To summarise, the benefits of the proposed system are: improved power consumption for the end-user, continual real-time processing, increased speed in responding to an event, more efficient use of processing resources, the ability to process private, sensitive and/or personal data locally rather than transmitting it to the cloud, and enhanced resilience to connectivity issues.

In another aspect of the invention, there is a server for generating a trained classification model for classifying an entity or classifying the similarity of the entity to other entities, the server comprising;

storage means arranged to store characteristics of a first plurality of entities, wherein each one of the first plurality of entities is classified with a first classification;

a training module arranged to train a classification model to classify an input entity with the first classification, or to classify the similarity of the input entity to the first plurality of entities, based on characteristics of the input entity, wherein the classification model is trained using characteristics of the first plurality of entities as training data; and wherein the server further comprises:

a transmitter arranged to transmit the trained classification model to a client device for use at the client device.

In another aspect of the invention, there is a client device for classifying an entity or classifying the similarity of the entity to other entities, the client device comprising;

a receiver arranged to receive a trained classification model from a server;

wherein the trained classification model has been trained by the server using characteristics of a first plurality of entities classified with a first classification as training data to classify an input entity with the first classification, or to classify the similarity of the input entity to the first plurality of entities, based on characteristics of the input entity;

wherein the client device further comprises:

memory arranged to store the trained classification model; and a processor arranged to process data comprising characteristics of at least one input entity using the trained classification model stored at the client device thus causing the trained classification model to output a signal that:

classifies the at least one input entity with the first classification; or classifies the similarity of the at least one input entity to the first plurality of entities.

In another aspect of the invention, there is a computer-implemented method for classifying an entity or classifying the similarity of the entity to other entities, the method comprising;

obtaining, at a server, characteristics of a first plurality of entities, wherein each one of the first plurality of entities is classified with a first classification;

training, at the server, a classification model to classify an input entity with the first classification, or to classify the similarity of the input entity to the first plurality of entities, based on characteristics of the input entity, wherein the classification model is trained using characteristics of the first plurality of entities as training data;

transmitting, from the server, the trained classification model to a client device;

storing the trained classification model at the client device; and processing data comprising characteristics of at least one input entity using the trained classification model stored at the client device thus causing the trained classification model to output a signal that:

classifies the at least one input entity with the first classification; or classifies the similarity of the at least one input entity to the first plurality of entities.

In another aspect of the invention, there is a computer-implemented method for generating a trained classification model for classifying an entity or classifying the similarity of the entity to other entities, the method comprising;

obtaining, at a server, characteristics of a first plurality of entities, wherein each one of the first plurality of entities is classified with a first classification;

training, at the server, a classification model to classify an input entity with the first classification, or to classify the similarity of the input entity to the first plurality of entities, based on characteristics of the input entity, wherein the classification model is trained using characteristics of the first plurality of entities as training data;

transmitting, from the server, the trained classification model to a client device for use at the client device.

In another aspect of the invention, there is a computer-implemented method for classifying an entity or classifying the similarity of the entity to other entities, the method comprising;

a receiving, at client device, a trained classification model from a server;

wherein the trained classification model has been trained by the server using characteristics of a first plurality of entities classified with a first classification as training data to classify an input entity with the first classification, or to classify the similarity of the input entity to the first plurality of entities, based on characteristics of the input entity;

storing the trained classification model at the client device;

processing data comprising characteristics of at least one input entity using the trained classification model stored at the client device thus causing the trained classification model to output a signal that:

classifies the at least one input entity with the first classification; or classifies the similarity of the at least one input entity to the first plurality of entities.

The trained classification model may be arranged to output a similarity score in order to classify the similarity of an input entity to the first plurality of entities.

The receiver at the client device may be arranged to receive a threshold similarity score. The processor may be arranged to execute an action if the similarity score of the at least one input entity meets the threshold similarity score.

The computer-implemented method may comprise receiving a threshold similarity score; and may comprise executing an action if the similarity score of the at least one input entity meets the threshold similarity score.

The processor, at the client device, may be arranged to execute a plurality of different actions, wherein each one of the actions is executed in response to a different similarity score being associated with the at least one input entity.

The computer-implemented method may comprise executing a plurality of different actions, wherein each one of the actions is executed in response to a different similarity score being associated with the at least one input entity.

The receiver at the client device may be arranged to receive a threshold similarity score; and the processor is arranged to classify the at least one input entity with the first classification if the similarity score of the at least one input entity meets the threshold similarity score.

The computer-implemented method may comprise receiving a threshold similarity score; and classifying the at least one input entity with the first classification if the similarity score of the at least one input entity meets the threshold similarity score.

The processor may be arranged to execute an action in response to the signal.

The computer-implemented method may comprise executing an action in response to the signal.

The action to be executed in response to the signal may be defined by an operator of the system.

The action executed in response to the signal may comprise generating a content instruction to display content at the client device, wherein the content is based on the at least one input entity being classified with the first classification, or based on the similarity of the at least one input entity to the first plurality of entities.

The action may comprise transmitting a message indicating that the at least one input entity is classified with the first classification, or indicating the similarity of the at least one input entity to the first plurality of entities.

A receiver, at the server, may be arranged to obtain characteristics of a second plurality of entities that are different to the first plurality of entities. The server may comprise a model analyser that is arranged to process data comprising the characteristics of the second plurality of entities using the trained classification model in order to output a similarity score for each of the second plurality of entities, wherein each similarity score output by the trained classification model is associated with one of the second plurality of entities and classifies the similarity of the associated entity to the first plurality of entities.

The computer-implemented method may comprise obtaining characteristics of a second plurality of entities that are different to the first plurality of entities. The computer-implemented method may comprise processing data comprising the characteristics of the second plurality of entities using the trained classification model in order to output a similarity score for each of the second plurality of entities, wherein each similarity score output by the trained classification model is associated with one of the second plurality of entities and classifies the similarity of the associated entity to the first plurality of entities.

The model analyser may be arranged to calculate the number of the second entities associated with each similarity score output by the trained classification model.

The computer-implemented method may comprise calculating the number of the second entities associated with each similarity score output by the trained classification model.

The model analyser may be arranged to calculate the number of the second entities that have a similarity score that meets a plurality of different thresholds.

The computer-implemented method may comprise calculating the number of the second entities that have a similarity score that meets a plurality of different thresholds.

The model analyser may be arranged to output a graphical display indicating the number of the second entities associated with each similarity score output by the trained classification model.

The computer-implemented method may comprise outputting a graphical display indicating the number of the second entities associated with each similarity score output by the trained classification model.

The model analyser may be arranged to output a graphical display indicating the number of the second entities that have a similarity score that meets a plurality of different thresholds.

The computer-implemented method may comprise outputting a graphical display indicating the number of the second entities that have a similarity score that meets a plurality of different thresholds.

The receiver at the client device may be arranged to receive a threshold similarity score set based on the number of the second entities associated with each similarity score output.

The computer-implemented method may comprise receiving a threshold similarity score set based on the number of the second entities associated with each similarity score output.

The receiver at the client device may be arranged to receive a threshold similarity score set based on the number of the second entities that have a similarity score that meets a plurality of different thresholds.

The computer-implemented method may comprise receiving a threshold similarity score set based on the number of the second entities that have a similarity score that meets a plurality of different thresholds.

The first plurality of entities classified with the first classification may fulfil a first set of predefined criteria. The predefined criteria may be adjustable.

The system may further comprise an operator device comprising:

an interface arranged to allow an operator to specify a first set of criteria for comparison against characteristics of an entity, wherein an entity that fulfils the first set of criteria is classified with the first classification; and a transmitter arranged to transmit the first set of criteria to the server;

wherein the server further comprises a receiver arranged to receive the first set of criteria; and wherein the training module is arranged to compare the first set of criteria against the characteristics of a plurality of entities and classify entities that fulfil the first set of criteria with the first classification.

The computer-implemented method may comprise receiving a first set of criteria specified by an operator for comparison against characteristics of an entity, wherein an entity that fulfils the first set of criteria is classified with the first classification.

The computer-implemented method may comprise transmitting the first set of criteria to the server.

The computer-implemented method may comprise receiving the first set of criteria.

The computer-implemented method may comprise comparing the first set of criteria against the characteristics of a plurality of entities and classifying entities that fulfil the first set of criteria with the first classification.

The training module may be arranged to calculate the number of entities that fulfil the first set of criteria.

The computer-implemented method may comprise calculating the number of entities that fulfil the first set of criteria.

The training module may be arranged to initiate training the classification model based on the number of entities that fulfil the first set of criteria.

The computer-implemented method may comprise initiating training the classification model based on the number of entities that fulfil the first set of criteria.

The client device may comprise a transmitter arranged to transmit a web element request indicative of a web element.

The computer-implemented method may comprise transmitting a web element request indicative of a web element.

The system may further comprise a web element server arranged to transmit the web element and the trained classifier to the client device, in response to the web element request.

The computer-implemented method may comprise transmitting the web element and the trained classifier to the client device, in response to the web element request.

The entities may be computing devices and the characteristics may thus describe the performance of the computing devices.

The computing devices with the first classification may be classified as malfunctioning, or likely to malfunction.

The entities may be users and the characteristics may describe attributes of the users and/or activity of the users.

The user with the first classification may be classified as a possible security threat.

The trained classifier may be arranged to receive characteristics of an entity as inputs.

Training the classification model may comprise determining a weighting for each one of a plurality of parameters, wherein the weighting associated with each parameter indicates the magnitude of the effect that the parameter has on the output signal.

Optionally, the computer-implemented method comprises determining whether the weighting associated with at least one of the parameters meets a threshold weighting. The training module may be arranged to determine whether the weighting associated with at least one of the parameters meets a threshold weighting. Optionally, the at least one parameter associated with a weighting that does not meet (or is below) a threshold weighting is not used by the trained classifier in classifying the entity, or classifying the similarity of the at least one input entity to the first plurality of entities. Optionally, the parameter identified is not used in that the parameter is not included in the processing performed by the trained classification model. Optionally, the at least one parameter associated with a weighting that does not meet (or is below) a threshold is omitted from the trained model. The training module at the server may perform omitting the at least one parameter from the trained model. Optionally, the at least one parameter is omitted in that it is deleted from the model, or in that the trained model is sent to the client device without the omitted parameter (or parameters). The threshold weighting may be based on the weightings of the parameters. For instance, the predefined threshold may be an average of the weightings of the parameters. The threshold weighting may be adjustable, and optionally the threshold weighting is adjustable by a user.

Optionally, a parameter associated with the lowest weightings is not used by the trained classifier in classifying the entity, or classifying the similarity of the at least one input entity to the first plurality of entities.

Optionally, a predefined number of parameter associated with the lowest weightings is not used by the trained classifier in classifying the entity, or classifying the similarity of the at least one input entity to the first plurality of entities.

The computer-implemented method may comprise retraining the classification model to classify an input entity with the first classification, or to classify the similarity of the input entity to the first plurality of entities. Optionally, the training module is arranged to retrain the classification model to classify an input entity with the first classification, or to classify the similarity of the input entity to the first plurality of entities. The classification model may be retrained using a second different set of characteristics of a plurality of entities classified with the first classification as training data. The classification model may be retrained using a second different set of characteristics of a plurality of entities, different to the first plurality of entities, classified with the first classification as training data.

The computer-implemented method may comprise retraining the classification model at a predetermined frequency, or after a predetermined time interval. The training module may be arranged to retrain the classification model at a predetermined frequency, or after a predetermined time interval. The predetermined frequency, or the predetermined time interval, may be adjustable, and optionally the predetermined frequency is adjustable by a user.

The computer-implemented method may comprise transmitting the retrained classification model to the client device. The transmitter may be arranged to transmit the retrained classification model to the client device.

The computer-implemented method may comprise receiving the retrained classification model at the client device, storing the retrained classification model at the client device; and processing data comprising characteristics of at least one input entity using the retrained classification model stored at the client device thus causing the retrained classification model to output a signal that: classifies the at least one input entity with the first classification; or classifies the similarity of the at least one input entity to the first plurality of entities.

The receiver at the client device may be arranged to receive the retrained classification model. The memory may be arranged to store the retrained classification model. The processor may be arranged to process data comprising characteristics of at least one input entity using the retrained classification model stored at the client device thus causing the retrained classification model to output a signal that: classifies the at least one input entity with the first classification; or classifies the similarity of the at least one input entity to the first plurality of entities.

The computer-implemented method may comprise transmitting the retrained classification model to the client device by only transmitting the parameters of the retrained model that differ from the parameters of the trained model. The transmitter may be arranged to transmit the retrained classification model to the client device by only transmitting the parameters of the retrained model that differ from the parameters of the trained model.

The computer-implemented method may comprise determining if an input entity has been classified with an initial classification; and processing data comprising characteristics of at least one input entity using the stored classification model, only if the stored classification model differs from the classification model used to classify the input entity with the initial classification.

The processor at the client device may be arranged to determine if an input entity has been classified with an initial classification; and wherein the processor is arranged to process data comprising characteristics of at least one input entity using the stored classification model, only if the stored classification model differs from the classification model used to classify the input entity with the initial classification.

The computer-implemented method may comprise determining if an input entity has been classified with an initial classification; obtaining a retrained classification at the client device from the server and processing data comprising characteristics of at least one input entity using the retrained classification model, only if the most recently trained classification model at the server differs from the classification model used to classify the input entity with the initial classification.

The processor at the client device may be arranged to determine if an input entity has been classified with an initial classification; and to obtain a retrained classification from the server and process data comprising characteristics of at least one input entity using the retrained classification model, only if the most recently trained classification model at the server differs from the classification model used to classify the input entity with the initial classification.

The trained classification model may comprise a liner regression model.

In another aspect of the invention, there is a computer program comprising instructions which, when the program is executed by a computer, cause the computer to carry out the computer-implemented method described herein.

In another aspect of the invention, there is a computer-readable medium comprising instructions which, when executed by a computer, cause the computer to carry out the computer-implemented method described herein.

In another aspect of the invention, there is a data carrier signal carrying the computer program described herein.

BRIEF DESCRIPTION OF THE DRAWINGS

Embodiments of the invention will be described, by way of example, with reference to the following drawings, in which.

DETAILED DESCRIPTION

Figure 1:
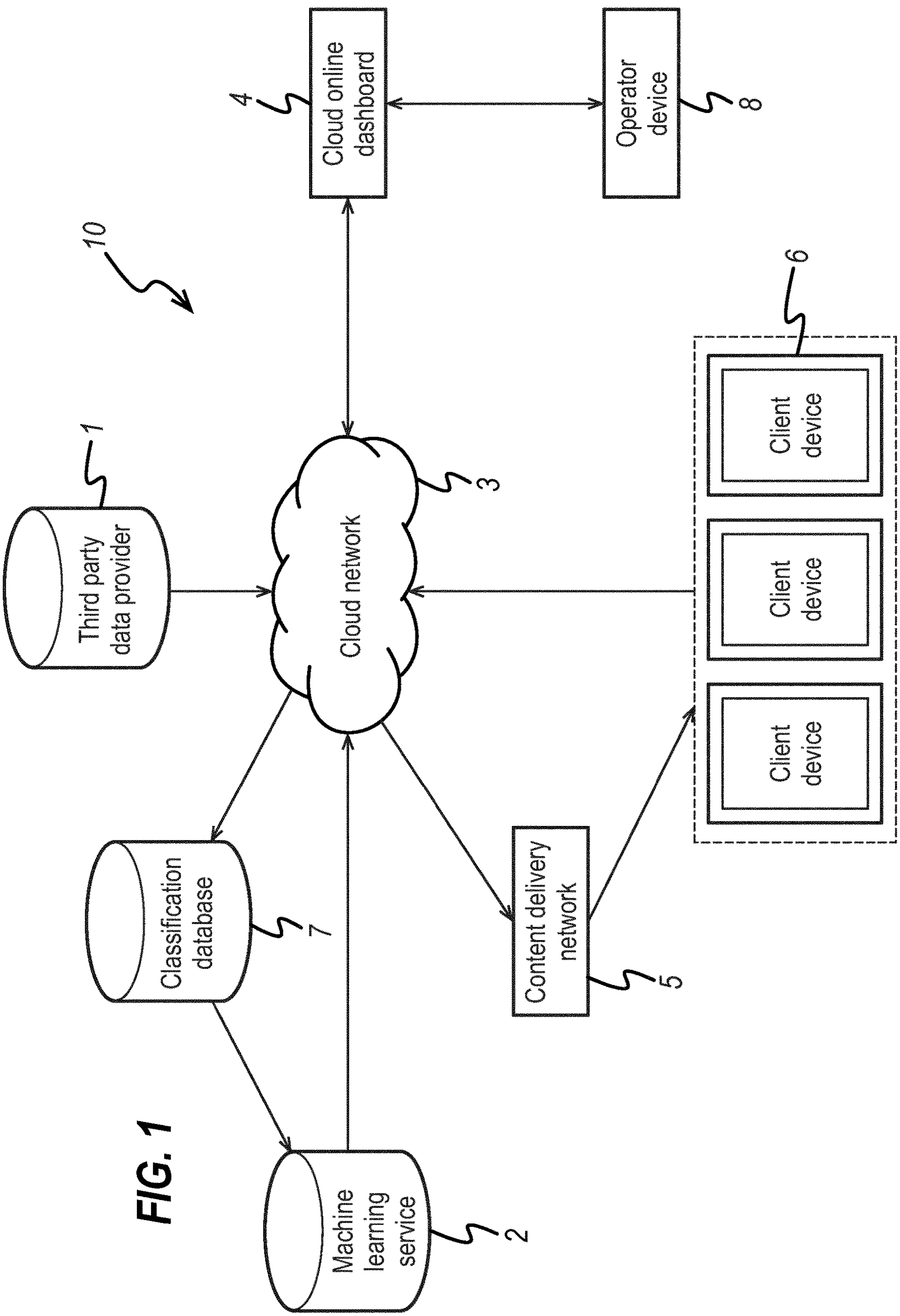
FIG. 1 illustrates an overview of a system for classifying an entity or classifying the similarity of the entity to other entities.

Referring to FIG. 1, there is a system 1 comprising a cloud network 3 that collates data describing entities from third party data providers 1. The cloud network 3 inputs the data into a classification database 7 that is used to train machine learning models through a machine learning service 2 at a server. The cloud 3 also feeds information to, and receives data from, a cloud online dashboard 4. The cloud network 3 may be the internet, for example.

The machine learning service 2 outputs model parameters to the cloud network 3. The model parameters are injected into code portions, or software development kits (SDKs), which are sent through content delivery networks 5 to client devices 6 where the segments are processed. The client devices 6 may be referred to as edge devices in the system 10. Each client device 6 may take the form of a mobile phone, a tablet, a laptop, a computer or another form of electronic device which comprises processing means and means of communicating data between it and the internet.

First party data is transmitted from the edge devices 6 to the cloud network 3. These data may be indicative of characteristics of entities, such as characteristics of the edge devices, characteristics of hardware within the edge devices or characteristics describing attributes of users of the edge devices 6. The data transmitted from the edge devices 6 may take many forms such as, but not limited to, personal and statistical data. These data are stored in the classification database 7.

An operator of the system 10 may wish to analyse entities or react to a specific portion of a set of entities. For instance, a website owner may wish to analyse users, or react to specific types of user that visit a website. The types of entities detected by the system may be based on set (or predetermined) criteria and the similarity of entities to the entities that meet the set criteria. It is desirable for the classification of entities to be carried out in real-time (or as to near real-time as possible) so that reactions to an entity with a particular classification can be made quickly.

Figure 2:
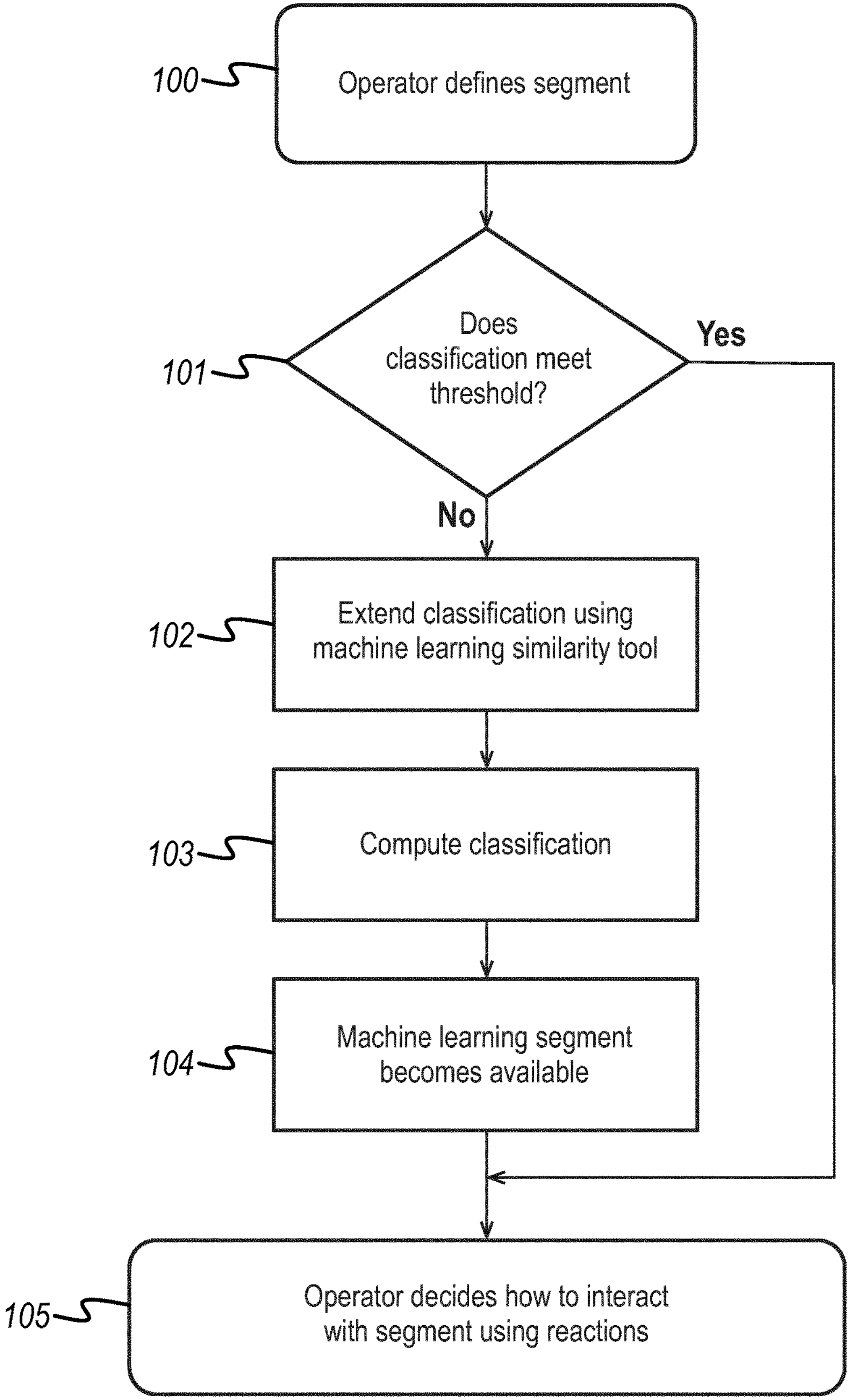
FIG. 2 illustrates a flowchart describing steps in a method of classifying an entity or classifying the similarity of the entity to other entities.

Referring to FIG. 2, there is a method in which an operator defines a classification and initiates training of a classification model at a server. The operator may perform this method at an operator device 8 interacting with the cloud online dashboard 4 and the machine learning service 2. The online dashboard 4 can display visual and statistical analytics in addition to having the functionality to alter aspects of the system 10 including the creation and modification of classes (or 'segments').

In this example, the online dashboard 4 is accessed via the internet using a browser on a mobile, tablet, laptop, computer or other internet-connected device. In the method, the online dashboard 4 displays the number of entities currently in a classification defined by the operator and offers the operator means to initiate a machine learning (ML) lookalike model, or in other words to train a classification model. One means for an operator to interact with the online dashboard is preferably a digital button or digital slider which the operator clicks on or drags using a cursor or otherwise, such as via touchscreen.

In step 100, the operator creates a classification (or 'segment') by defining set criteria that the characteristics of an entity must satisfy to be included in the segment. Depending on the data fields, the criteria may take the form of Boolean logic or it may require more complex logic. Boolean logic may also be required to combine criteria. For example, a device may be classified as being likely to malfunction if the temperature of the device meets a certain threshold and the device has been operating for a particular length of time. In another example, a user one of the client devices 6 may be classified with a particular classification if that user has no children and is less than 30 years old.

In step 101, once the criteria for the classification has been defined, the operator device 8 asses the number of entities that fulfil the criteria. There may be a minimum number, or a threshold number, of entities that are classified by the set criteria. If the outcome of the classification is that this threshold is not met, the method proceeds to step 102. If the threshold is met, the method proceeds to step 105.

In step 102, a classification model is trained, using training data, to classify an entity with the classification corresponding with the criteria set in step 100, or to classify the similarity of an entity to entities fulfilling the criteria set in step 100. The trained classification model takes characteristics of an entity as its input and classifies an entity, or its similarity, based on the input characteristics. The classification model is trained using characteristics of the entities that fulfil the criteria set in step 100 as the training data.

The classification model is trained on the data indicative of characteristics of entities stored at the classification database 7. In step 103, once the classification model has been trained, it is used to compute the similarities of the entities based on the data that is stored which describes these entities. The level of similarity of each entity to the entities that fulfil the pre-set criteria is output as a similarity metric, which may comprise a percentage. For instance, if an entity is given a similarity metric of 99%, this indicates that the entity is almost identical to the entities that fulfil the pre-set criteria (in terms of the criteria being assessed at least). On the other hand, if an entity is given a similarity metric of 1%, this indicates that the entity is very dissimilar to the entities that fulfil the pre-set criteria (in terms of the criteria being assessed at least).

The trained classification model is used to deduce how many entities are included in the classification for several different similarity metric values. Once the computation is complete, which may take several hours for instance, the results can outputted in graphical form in a similarity graph an example of which is illustrated in FIG. 3.

Figure 3:
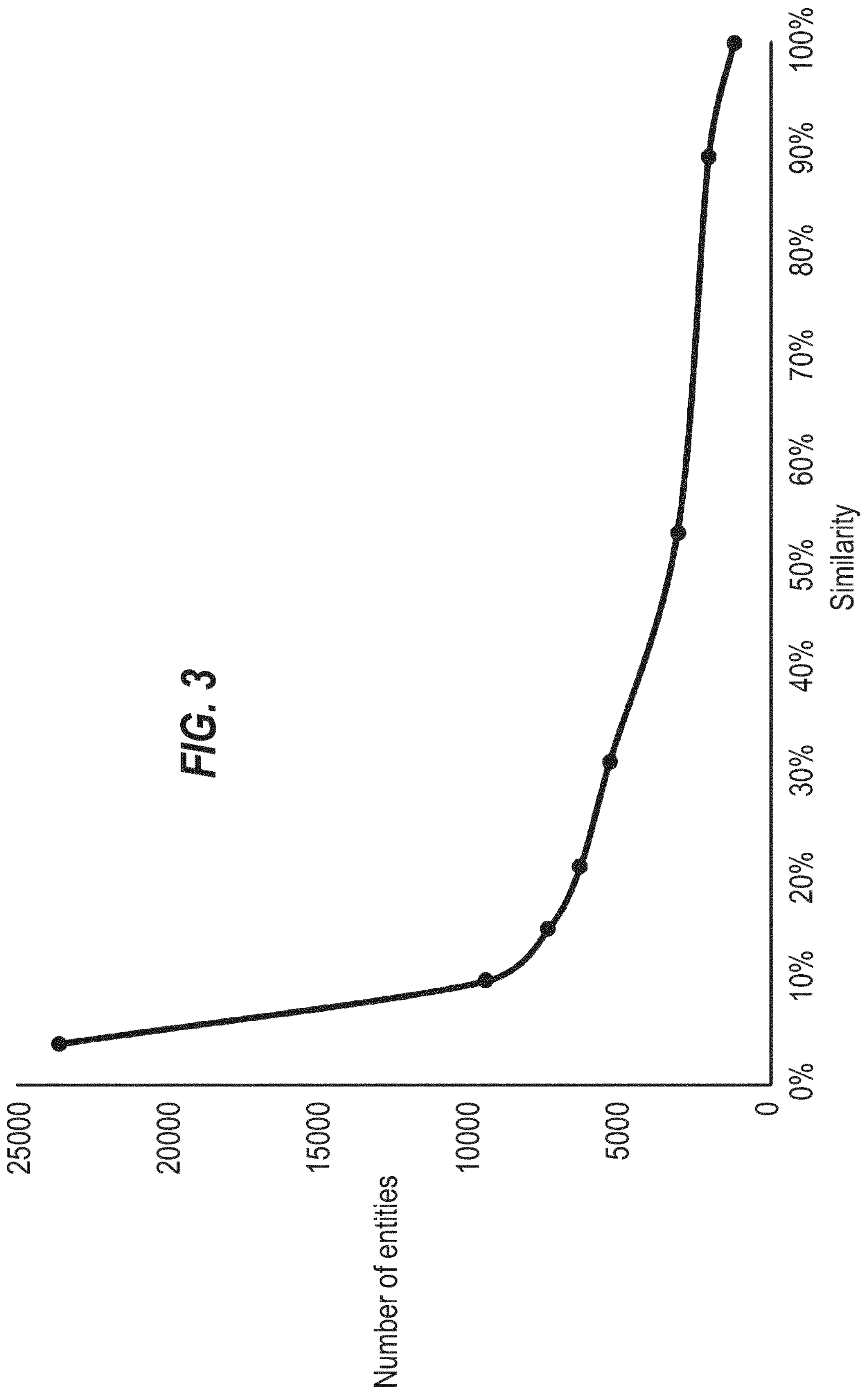
FIG. 3 illustrates a graphical display of an output from a trained classification model.

FIG. 3 illustrates a graphical display which is displayed at the operator device 8. This display illustrates the number of entities (whose data is stored in the classification database 7) that have been assigned a similarity metric that meets a particular threshold (i.e. 90%, 55%, 30% etc.). In other words, the graph illustrates the number of entities that have a similar score that is the same as or greater than a particular threshold.

As shown in FIG. 3, the number of entities that meet a threshold is inversely proportional to the similarity threshold. As the number of entities decreases, the similarity threshold increases. On the other hand, as the number of entities increases, the similarity threshold decreases. The similarity threshold can take a value between 0% and 100%. A similarity score of 100% would result in the same number of entities being included in the segment as was achieved with the set criteria prior to the training of the classification model. By reducing the similarity score below 100%, some entities that did not meet the set criteria, but whose data is very similar to that of the entities that did meet the criteria, are added give the same classification as the entities that did meet the set criteria. As the similarity threshold is lowered, more entities are included in the classification albeit with less similarity to the original set of entities. The operator can choose how strict or loose the classification becomes by selecting the similarity threshold accordingly. The operator may select a number of entities, as shown on the y-axis of the graph, and the corresponding similarity may be selected accordingly.

In step 105, after the operator has specified the preferred number of entities for inclusion in the classification or the desired similarity threshold value, the operator then specifies what reaction is to occur when an entity is classified. A reaction may be defined as a process by which entities in particular classification can be passed to other platforms.

Although the system functions with a minimal number of criteria specified by the operator, for the lookalike model similarity scoring to perform to a satisfactory accuracy level, it is recommended that at least ten criteria be specified for each classification.

In another example, an algorithm can be used to cause different actions to be initiated depending on the similarity percentage assigned to an entity. This algorithm can be used instead of the similarity threshold, or in combination with this threshold.

For example, if a user has a similarity score of 71%, then the algorithm causes a general message to be shown to the user. If a user has a similarity score of 89% then a more detailed message will be displayed, and if a user has a similarity score of 93% then an even more detailed message will appear. A person skilled in the art will appreciate that this system is broad in its applications and potential uses and the example provided is just one of many.

Figure 4:
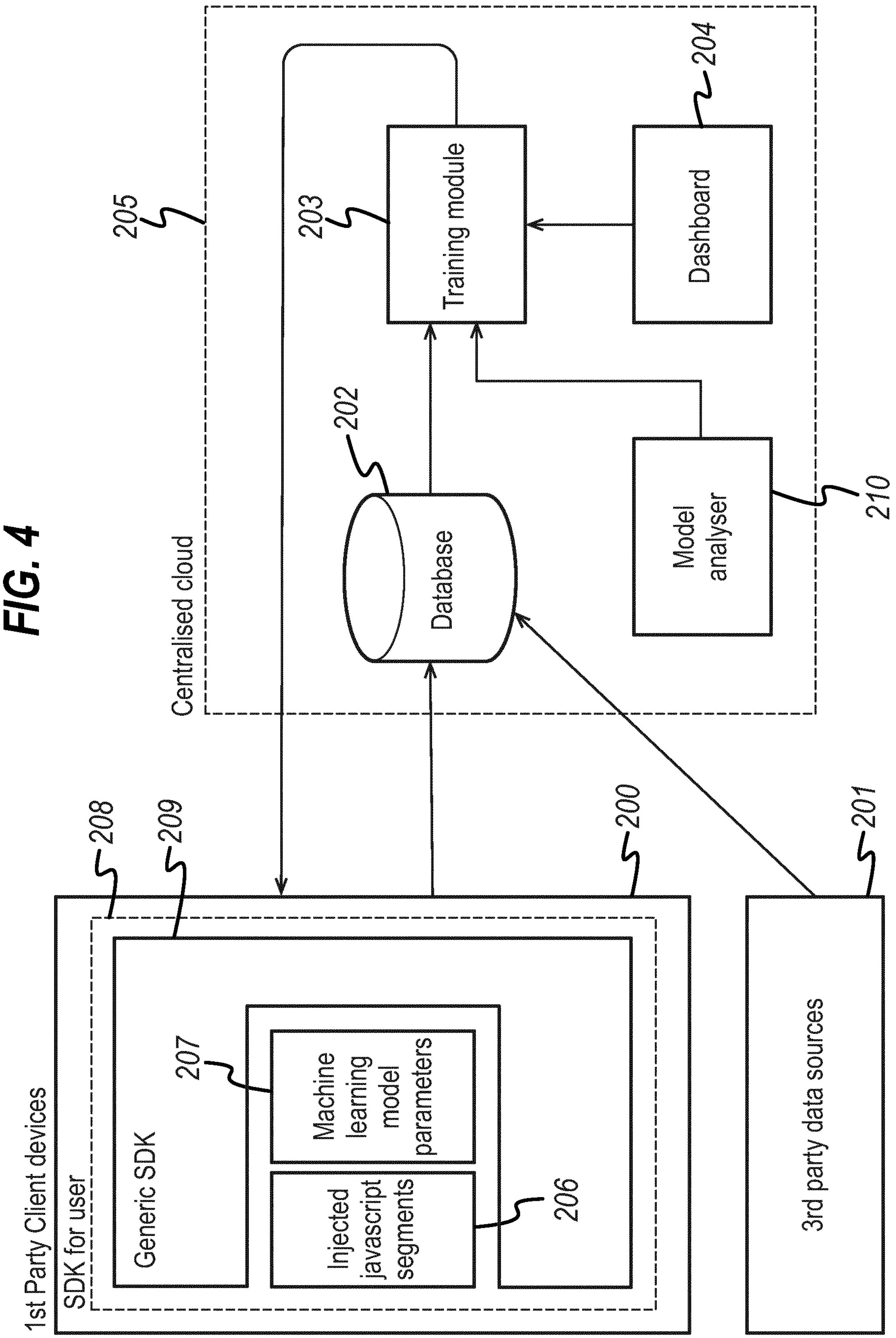
FIG. 4 illustrates further detail of the system.

The following describes, with reference to FIG. 4, the processes and data flow that occurs when employing a machine learning lookalike model to expand the number of entities included in a particular classification.

Data from the client devices 200 and data from third party sources 201 are sent to and stored in a centralised database 202 of a cloud system 205. The data from the client devices 200 and the third party sources describe characteristics of entities, such as devices or users of the devices. When an operator requests that the machine learning model be run via the online dashboard 204, the data from the client devices 200 and third party source 201 are used to train the lookalike machine learning model 203 using a training module 203 in the system 205. The data for this graphical display described with reference to FIG. 3 is generated by a model analyser 210.

Each criteria of an entity is known as a feature of the model. Each feature is treated as a separate dimension in the model. In the preferred embodiment, the model is based on a logistic regression fit. However, it will be appreciated that many other alternative models may be used with different mathematical properties suitable for different implementations of the invention, such as linear regression or neural networks.

The training of the model results in weightings of the features of the model. As part of the training process, a regularizer is used to decrease the number of parameters (i.e. the 'features') used in the final model: a punishment (the regularization term) is applied for a decrease in model size, which has the effect of removing low-weight (near 0) model parameters that do not have a significant impact on similarity scores during model evaluation. The low-weighted characteristics may not be used in that the trained classification model does not use them in determining the similarity score or in classifying entities.

The training module 203 at the cloud system 205 may perform a regularization process that causes low-weighted parameters that have little effect on the classification to be removed from the final set of model parameters. For instance, parameters with a weight below a predetermined threshold may be removed from the model. Since parameters must be transmitted to edge devices, stored, and used during classifications, a smaller number of parameters can result in better performance because fewer parameters are sent to the edge devices. In one specific example, the dashboard 204 is arranged to allow the user to adjust the level of regularization, for instance by adjusting the predetermined threshold for the weights of parameters. This can achieve better device and network performance in exchange for a potential loss of classification accuracy. The system may provide a default level of regularization, such as a default threshold for the weights. In this way, the user is able to choose whether manual adjustment of the level of regularization is required.

Once the model training with regularization has been completed, the output parameters for the model are packaged into a code portion 208 (or an SDK) that is sent to and stored at the client device 6. In the preferred embodiment, the SDK contains a generic SDK element 209 and injected JavaScript segments 206 alongside the injected machine learning model parameters 207. The SDK 208 is sent to a client edge device 200 once that device accesses a website specified by the operator, such a website of which that operator is the administrator.

Figure 5:
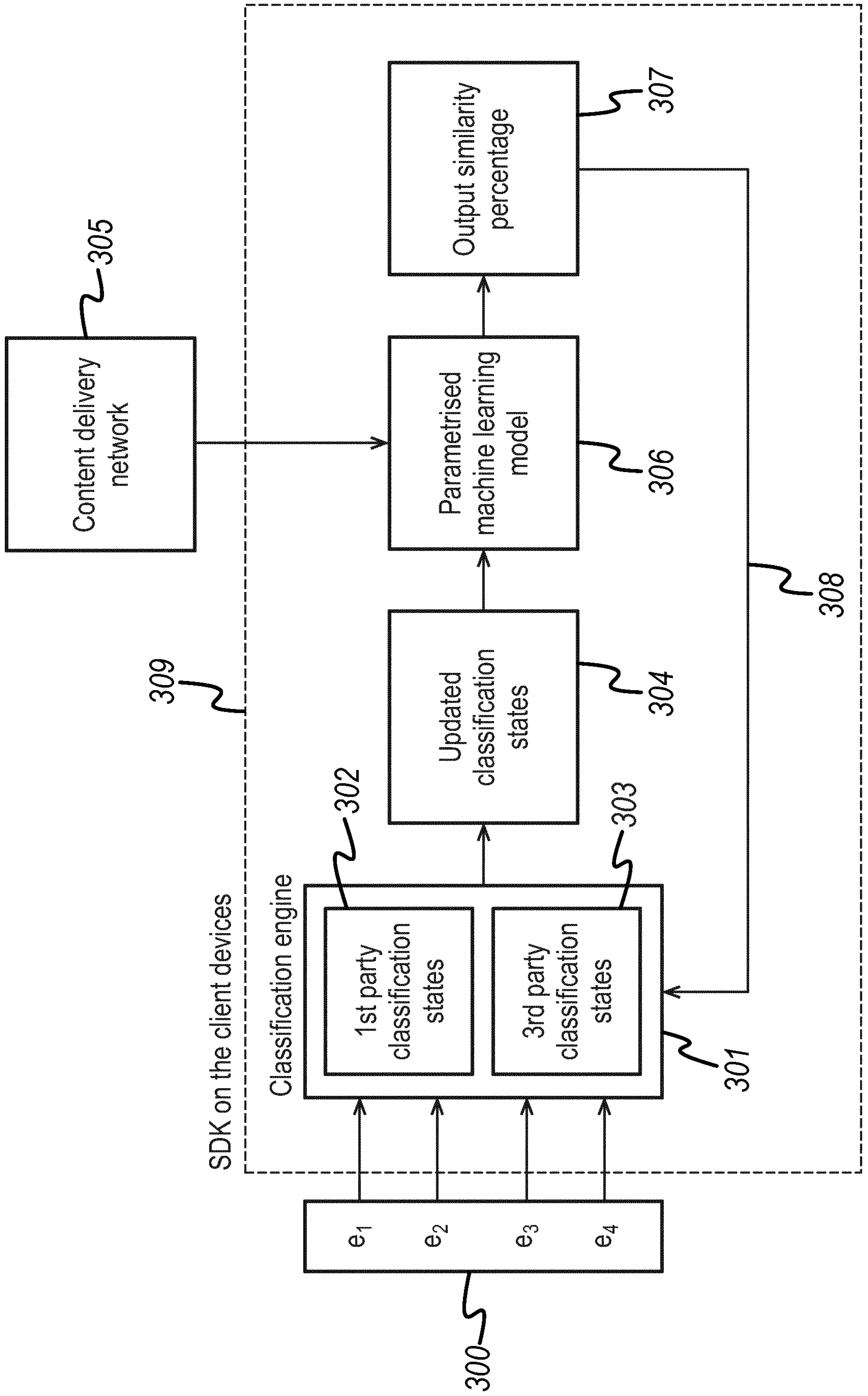
FIG. 5 illustrates an overview of a method classifying an entity using the trained classification model.

Referring to FIG. 5, the trained classification model is executed at the client device 309 in response to an event in order to classify an entity. An event can be any form of interaction from the entity, such as a device or a user. This could be, for example, a visit of a user to a webpage, the selection of a button, a user scrolling down a webpage.

Events, denoted $e_x$ 300, feed into the SDK on the client device 309. The events pass into the classification engine 301 which gathers together data on the user from both first party sources and third party data providers and aggregators. The classification engine 301 takes the first party classification states 302 and third party classification states 303 and outputs updated classification states 304. The output manifests itself as a vector of Boolean values. The classification states are inputted into the parametrised machine learning model 306 (i.e. the trained classification model) which receives the parameters for the model from the cloud servers via a content delivery network 305, as described earlier.

In the preferred embodiment, the processing of the model involves a dot product between the segment state vector and the model parameters, followed by application into a sigmoid function to generate a probability. However, it will be appreciated that alternative mathematical methods may be used to compute the model output.

The segments are processed and calculated with every event that occurs. However, the updating of the model parameters is far less frequent, for instance the parameters for the model at the client device may change only when the model in the cloud is retrained. The cloud system 205 may only transmit the parameters that have changed when updating the model at the client device 309, rather than transmitting all of the parameters of the retrained model including the parameters that have not changed. This makes more efficient use of bandwidth.

It is desirable to retrain the models as new data are received and uploaded. However, retraining the model continuously is computationally expensive. However, in system described herein the model may be retrained at the server a predetermined frequency. This predetermined frequency may be set in order to maintain a balance between model accuracy and use of processing resources. The predetermined frequency may be user defined.

When the model is trained some of the classifications assigned to entities previously may not be consistent with the classifications output by new model. Therefore, it is desirable to reclassify entities once the model has been retrained. However, reclassifying entities can also be computationally expensive. For instance, if 100 million previously classified were to be reclassified with the retrained model, this would incur a large processing burden on the system. The system disclosed herein improves the efficiency of this process by making available the new model parameters to a client device when a classification is required on the device. The new model parameters may be sent to the client device when a previously classified entity is detected for reclassification, for instance when a previously classified user visits a webpage. Once the previously classified entity has been detected, the new model parameters are pulled to the device and used. In this sense, reclassification is only performed when requested (e.g. if only 1 M of the 100 M entities need classification), and by simultaneously distributing the computational load to devices, it is quicker and puts less strain on centralised cloud infrastructure.

The machine learning model outputs the similarity metric 307, for instance expressed in the form of a percentage after a sigmoid function is applied. The similarity is treated as any other state would be and fed back into the classification engine 308 where it will be updated following an event. Included in the SDK sent to the client device 309 is the similarity threshold value (otherwise known as the "precision") against which the outputted similarity classification would be compared. This results in the Boolean classification state for the machine learning model; TRUE or FALSE. TRUE meaning that the user is included in the segment based on its similarity score, FALSE meaning the contrary.

Once the processing is complete and it has been deduced that a user is in the segment, reactions may be triggered. Equally, in another embodiment, it is conceivable that reactions be created such that they are triggered if the user does not enter the segment.

In the method, the first party and third party entity data fields are inputs to the machine learning model. The inclusion of a greater number of fields in the model is likely to result in a more accurate similarity score as the dependencies between all the fields can be assessed and taken into account. As part of the model training, a weighting is deduced for each feature. The weightings indicate the extent of the effect any given feature has on the segment size. Features with very low weightings, indicating an insignificant effect on the segment size, are discarded. Various methods for deciding which features are removed may be used. These may include, but are not limited to:

A threshold weighting set at a certain predefined value. Features whose weightings are smaller than this threshold are discarded.

A weightings distribution-related threshold. For example, the threshold may be the average weighting, a proportion of the average weighting or a certain percentile of the weightings. Features whose weightings are smaller than this threshold are discarded.

Discarding a set number of features with the lowest weightings.

As each feature represents a dimension of the model, reducing the number of features through the regularisation process therefore reduces the number of dimensions of the model. This, in turn, results in fewer parameters needing to be transmitted to the edge devices and a simpler evaluation calculation. This reduces the computational cost, time taken and energy usage to process the data on the edge with minimal effect on the accuracy of the segment.

As part of the logistic regression training process, one of the model parameters learnt is a constant bias term. It embodies systemic likelihood to fall into a seed classification given the classification membership of all known users. This increases accuracy across all lookalike segments, but particularly in the case when there is little or no segment data for a user, the bias term acts as a default probability that predicts similarity based on data for the entire audience.

Although in the embodiment described above users are visitors to an operator's website, this invention is broader in scope and it will be appreciated that it is also applicable to, for example, users of a gaming app or a software package.

The scalability of the disclosed invention is highly suitable for IoT devices, enabling sensor data to be monitored and reacted to in near real-time. For example, in a datacentre, there may be a plethora of highly sensitive temperature sensors distributed around the servers to continuously measure the temperature of the electronic chips. Segments can be set up for those with significant deviations in temperature. Reactions may include, for example: increasing the fan speed, adjusting the building's climate control or managing the workload of the processors. Average operating temperatures and sensor characteristics can be taken into account by the machine learning model. With the segmentation being carried out on the edge, the segments can be calculated, and reactions triggered, in near real-time ensuring the chips are kept at the optimum temperature.

Another potential use case of this invention is in anomaly detection, especially when the number of users or devices is very large and the anomaly needs to be detected rapidly. A prime example of this is in eCommerce where fraudulent transactions need to be spotted and reacted to as quickly as possible. With the roll out of smart-cards, e-wallets and smart phones with fintech or banking applications, there is an abundance of potential edge devices that could be utilised for this purpose. The integration of machine learning to expand segments in this contexts means that anomalous transactions, which would not have been captured in the segment from the set segment criteria alone, are still able to be discovered.

Since private and sensitive information is kept and evaluated locally, implementation of the proposed system in the fitness and healthcare device markets could be beneficial. Users may be wary of sharing their personal data with cloud-based systems. The proposed system solves this privacy concern by ensuring raw user data (e.g. heart rate, blood pressure) is never sent from their personal devices and therefore cannot be accessed by third parties such as insurance companies or credit rating agencies.

Figure 6:
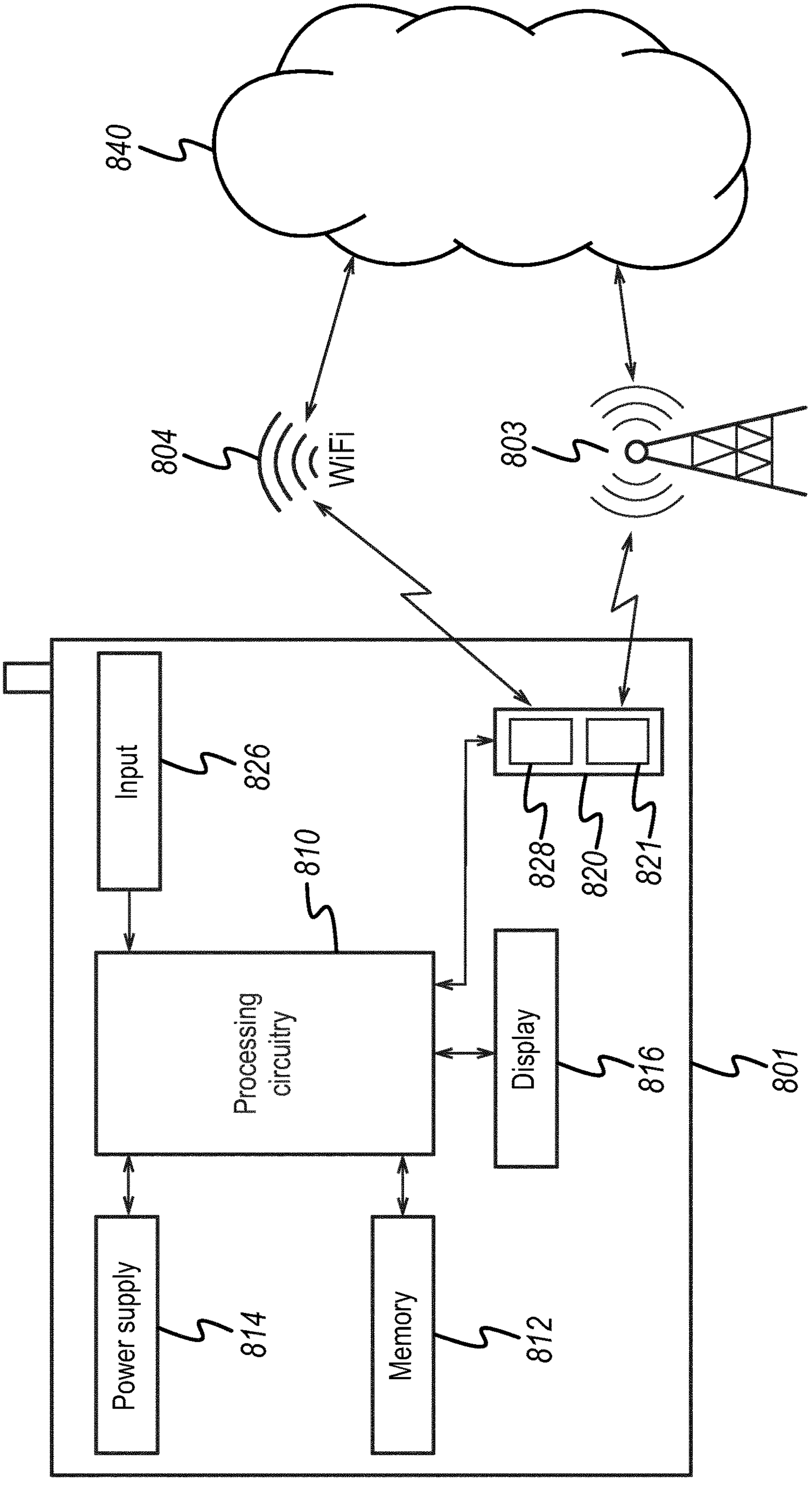
FIG. 6 illustrates an example of an electronic device of the system.

FIG. 6 shows an exemplary electronic device 801 according to any of the electronic devices of this disclosure (such as the third party data provider 1, the machine learning service 2, the cloud online dashboard 4, the client device 6, the classification database 7, the operator device 8, or any one of the devices in the cloud network 3 or the content delivery network 5). The electronic device 801 comprises processing circuitry 810 (such as a processor) and a memory 812. Electronic device 801 may also comprise one or more of the following subsystems: a power supply 814, a display 816, a wireless transceiver 820, and an input 826.

Processing circuitry 810 may control the operation of the electronic device 801 and the subsystems 812-828. Processor 810 is communicatively coupled with subsystems 812-828. Memory 812 may comprise one or more of random access memory (RAM), read only memory (ROM), non-volatile random access memory (NVRAM), flash memory, other volatile memory, and other non-volatile memory.

Display 816 may be communicatively coupled with the processing circuitry 810, which may be configured to cause the display 816 to output images. The display 816 may comprise a touch sensitive interface, such as a touch screen display. The display 816 may be used to interact with software that runs on the processor 810 of the electronic device 801. The touch sensitive interface permits a user to provide input to the processing circuitry 810 via a discreet touch, touches, or one or more gestures for controlling the operation of the processing circuitry and the functions described herein. It will be appreciated that other forms of input interface may additionally or alternatively be employed for the same purpose, such as the input 826 which may comprise a keyboard or a mouse at the input device.

The transceiver 820 may comprise one or more long-range RF transceivers that are configured to operate according to communication standard such as LTE, UMTS, 3G, EDGE, GPRS, GSM, and Wi-Fi. For example, electronic device 801 may comprise a first long-range wireless transceiver 821, such as a cellular transceiver, that is configured to communicate with a cell tower 803 via to a cellular data protocol such as LTE, UMTS, 3G, EDGE, GPRS, or GSM, and a second long-range wireless transceiver 828, such as a Wi-Fi transceiver, that is configured to communicate with a wireless access point 804 via to a Wi-Fi standard such as 802.11 ac/n/g/b/a. In this regard and for the purposes of all embodiments herein concerning a long-range wireless protocol, a long-range wireless protocol may be a protocol which is capable and designed for communication over 5, 10, 20, 30, 40, 50, or 100 m. This is in contrast to short-range wireless protocol mentioned above. The long-range wireless protocol may communicate utilizing higher power than the short-range wireless protocol. The range (e.g. line of sight distance) between the long-range end nodes (electronic device and router or base station) for the long-range wireless protocol may be greater than the range (e.g. line of sight distance) between the short-range end nodes (e.g. electronic device and wireless beacon).

Electronic device 801 may be configured to communicate via the long-range wireless transceiver 820 with a network

840. Network 840 may be the cloud network 3 or any such wide area network, such as the internet, or a local area network. Electronic device 801 may be further configured to communicate via long-range wireless transceiver 820 and network 840 with one or more servers or user devices. These servers or user devices may be any one of those described herein.

The term "comprising" encompasses "including" as well as "consisting" e.g. a composition "comprising" X may consist exclusively of X or may include something additional e.g. X+Y.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

It will be appreciated that the modules described herein may be implemented in hardware or in software. Furthermore, the modules may be implemented at various locations throughout the system.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the module described above may be implemented in hardware or software.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A system for classifying an entity or classifying a similarity of the entity to other entities, the system comprising:

a server comprising:

a memory storage arranged to store characteristics of a first plurality of entities, wherein each one of the first plurality of entities is classified with a first classification;

a training module arranged to:

train a classification model to classify an input entity with the first classification, or to classify the similarity of the input entity to the first plurality of entities, based on characteristics of the input entity, wherein the classification model is trained using the characteristics of the first plurality of entities as training data, wherein the training of the classification model comprises determining a weight for each of a plurality of parameters, and wherein the weight for each one of the plurality of parameters indicates a magnitude of an effect that parameter has on an output signal of the classification model, and perform a regularization process that omits at least one parameter from the plurality of parameters that is associated with a weight that does not meet an adjustable threshold weighting from the trained classification model; and a transmitter arranged to transmit non-omitted parameters of the trained classification model to a client device; and wherein the system further comprises the client device that is a mobile phone, a tablet, a laptop, or a computer, and wherein the client device comprises:

a receiver arranged to receive the non-omitted parameters of the trained classification model; and a memory arranged to store the non-omitted parameters of the trained classification model;

a processor arranged to process data comprising characteristics of at least one input entity using the non-omitted parameters of the trained classification model stored at the client device thus causing the trained classification model to output the output signal that:

classifies the at least one input entity with the first classification; or classifies the similarity of the at least one input entity to the first plurality of entities, wherein the classifying with the trained classification model reduces computation cost while preserving accuracy of the first classification or the similarity.

2. The system of claim 1, wherein the trained classification model is arranged to output a similarity score in order to classify the similarity of the input entity to the first plurality of entities; and wherein the receiver at the client device is arranged to receive a threshold similarity score; and the processor is arranged to execute an action if the similarity score of the at least one input entity meets the threshold similarity score.

3. The system of claim 2, wherein the processor, at the client device, is arranged to execute a plurality of different actions, wherein each one of the actions is executed in response to a different similarity score being associated with the at least one input entity; and/or the processor is arranged to classify the at least one input entity with the first classification if the similarity score of the at least one input entity meets the threshold similarity score.

4. The system of claim 1, wherein a receiver, at the server, is arranged to obtain characteristics of a second plurality of entities that are different from the first plurality of entities; and the server further comprises a model analyser that is arranged to process data comprising the characteristics of the second plurality of entities using the trained classification model in order to output a similarity score for each of the second plurality of entities;

wherein each similarity score output by the trained classification model is associated with one of the second plurality of entities and classifies the similarity of the at least one input entity to the first plurality of entities;

wherein the model analyser is arranged to calculate a number of second entities associated with each similarity score output by the trained classification model; and wherein the receiver at the client device is arranged to receive a threshold similarity score set based on the number of the second entities associated with each similarity score.

5. The system of claim 1, wherein the system further comprises an operator device comprising:

an interface arranged to allow an operator to specify a first set of criteria for comparison against characteristics of an entity in the at least one input entity, wherein the entity that fulfils the first set of criteria is classified with the first classification; and a transmitter arranged to transmit the first set of criteria to the server, wherein the server further comprises a receiver arranged to receive the first set of criteria; and wherein the training module is arranged to compare the first set of criteria against the characteristics of a second plurality of entities and classify the second plurality of entities that fulfil the first set of criteria with the first classification, and wherein the training module is arranged to:

calculate a number of the second plurality of entities that fulfil the first set of criteria; and initiate training the classification model based on the number of the second plurality of entities that fulfil the first set of criteria.

6. The system of claim 1, wherein each entity of the first plurality of entities is a computing device and the characteristics of the first plurality of entities describe a performance of each computing device respectively.

7. The system of claim 1, wherein each entity of the first plurality of entities is a user and the characteristics of the first plurality of entities describe attributes of each user respectively.

8. The system of claim 1, wherein the training module is arranged to retrain the classification model to classify the input entity with the first classification, or to classify the similarity of the input entity to the first plurality of entities, wherein the classification model is retrained using a second different set of characteristics of the first plurality of entities classified with the first classification as training data; and wherein the classification model is retrained using a second different set of characteristics of a second plurality of entities, different from the first plurality of entities, classified with the first classification as training data; and/or wherein the training module is arranged to retrain the classification model at a predetermined frequency.

9. The system of claim 8, wherein the transmitter is arranged to transmit the retrained classification model to the client device; and wherein the receiver at the client device is arranged to receive the retrained classification model; and the memory is arranged to store the retrained classification model; and the processor is arranged to process data comprising the characteristics of the at least one input entity using the retrained classification model stored at the client device thus causing the retrained classification model to output the output signal that:

classifies the at least one input entity with the first classification; or classifies the similarity of the at least one input entity to the first plurality of entities.

10. The system of claim 9, wherein the transmitter is arranged to transmit the retrained classification model to the client device by transmitting only parameters of the retrained classification model that differ from parameters of the trained classification model.

11. The system of claim 10, wherein the processor at the client device is arranged:

to determine if the at least one input entity has been classified with an initial classification; and wherein the processor is arranged to process the data comprising the characteristics of the at least one input entity using the retrained classification model, only if the retrained classification model differs from the classification model used to classify the input entity with the initial classification.

12. The system of claim 1, wherein the processor at the client device is arranged:

to determine if an input entity in the at least one entity has been classified with an initial classification; and to obtain a retrained classification model from the server and process the data comprising the characteristics of the input entity using the retrained classification model, only if the most recently trained classification model at the server differs from the classification model used to classify the input entity with the initial classification.

13. A computer-implemented method for generating a trained classification model for classifying an entity or classifying a similarity of the entity to other entities, the method comprising:

obtaining, at a server, characteristics of a first plurality of entities, wherein each one of the first plurality of entities is classified with a first classification;

training, at the server and using the characteristics of the first plurality of entities as training data, a classification model to classify an input entity with the first classification, or to classify the similarity of the input entity to the first plurality of entities, based on characteristics of the input entity, wherein training the classification model comprises:

determining a weight for each of a plurality of parameters, wherein the weight for each of the plurality of parameters indicates a magnitude of an effect that parameter has on an output signal of the classification model, and performing a regularization process that omits at least one parameter from the plurality of parameters that is associated with a weight that does not meet an adjustable threshold weighting from the trained classification model; and transmitting, from the server, non-omitted parameters of the trained classification model to a client device for use at the client device.

14. The computer-implemented method of claim 13, wherein transmitting the trained classification model without the omitted at least one parameter to the client device reduces computation cost while preserving accuracy of the trained classification model performing classification on the client device.

15. The computer-implemented method of claim 13, further comprising:

processing, on the client device, data comprising characteristics of at least one input entity using the trained classification model;

causing the trained classification model to output the output signal that:

classifies the at least one input entity with the first classification; or classifies the similarity of the at least one input entity to the first plurality of entities.

16. A system for classifying an input entity or classifying a similarity of the input entity to other entities, the system comprising:

a server comprising:

a memory storage arranged to store characteristics of a first plurality of entities, wherein each one of the first plurality of entities is classified with a first classification;

a training module arranged to:

train a classification model to classify an input entity with the first classification, or to classify the similarity of the input entity to the first plurality of entities, based on characteristics of the input entity, wherein the classification model is trained using the characteristics of the first plurality of entities as training data, wherein the training of the classification model comprises determining a weight for each of a plurality of parameters; and wherein the weighting for each one of the plurality of parameters indicates a magnitude of an effect that that parameter has on an output signal of the classification model; and perform a regularization process that omits at least one parameter from the plurality of parameters that is associated with a weight that does not meet an adjustable threshold weighting from the trained classification model; and a server transmitter arranged to transmit the trained classification model without the omitted at least one parameter.

17. The system of claim 16, wherein the client device comprises:

a processor arranged to process data comprising characteristics of at least one input entity using the trained classification model stored at the client device and cause the trained classification model to output the output signal that:

classifies the at least one input entity with the first classification; or classifies the similarity of the at least one input entity to the first plurality of entities.

18. The system of claim 17, wherein the client device is further arranged to receive a threshold similarity score, and the processor is further arranged to classify the at least one input entity with the first classification if a similarity score of the at least one input entity meets the threshold similarity score.

19. The system of claim 16, wherein the training module is arranged to retrain the classification model at a predetermined frequency.

20. The system of claim 16, wherein the client device is a mobile phone, a tablet, a laptop, or a computer.

* * * * *